United States Patent [19]

Kohmitsu et al.

[11] Patent Number: 5,030,691

[45] Date of Patent: Jul. 9, 1991

[54] CURABLE POLYMER COMPOSITION

[75] Inventors: Shintaro Kohmitsu, Takasago; Hiroshi Wakabayashi, Kobe; Toshifumi Hirose, Kobe; Katsuhiko Isayama, Kobe, all of Japan

[73] Assignee: Kanegafuchi Chemical Industry Co., Ltd., Osaka, Japan

[21] Appl. No.: 343,372

[22] Filed: Apr. 26, 1989

[30] Foreign Application Priority Data

Apr. 28, 1988 [JP] Japan ................................. 63-106609

[51] Int. Cl.$^5$ .............................................. C08L 83/14
[52] U.S. Cl. .................................... 525/100; 525/404
[58] Field of Search .............................. 525/100, 404

[56] References Cited

U.S. PATENT DOCUMENTS 4,593,068  6/1986  Hirose et al. ......................... 525/100
4,910,255  3/1990  Wakabayashi ....................... 525/100

FOREIGN PATENT DOCUMENTS 62-146959   6/1987  Japan ................................... 525/100
62-252489  11/1987  Japan ................................... 525/100

Primary Examiner—John C. Bleutge
Assistant Examiner—R. Dean, Jr.
Attorney, Agent, or Firm—Wegner, Cantor, Mueller & Player

[57] ABSTRACT

A curable polymer composition which comprises:
(A) a copolymer comprising a backbone which comprises (1) repeating units derived from at least one monomer selected from the group consisting of alkyl acrylates having 1 to 8 carbon atoms in the alkyl group and alkyl methacrylates having 1 to 8 carbon atoms in the alkyl group and (2) repeating units derived from at least one monomer selected from the group consisting of alkyl acrylates having at least 10 carbon atoms in the alkyl group and alkyl methacrylate having at least 10 carbon atoms in the alkyl groups and (B) an oxyalkylene base polymer having at least one silicon-containing group to the silicon atom of which at least one hydroxyl group or hydrolyzable group is bonded and which is cross linkable through formation of a siloxane bond, which composition has improved transparency and storage stability and can provide a cured material having good weather resistance.

8 Claims, No Drawings

CURABLE POLYMER COMPOSITION

BACKGROUND OF THE INVENTION

1. Field of the Invention

The present invention relates to a curable polymer composition. More particularly, the present invention relates to a curable polymer composition comprising a specific alkyl acrylate and/or alkyl methacrylate (hereinafter collectively referred to as "alkyl (meth)acrylate") base copolymer and an oxyalkylene base polymer having at least one silicon-containing group to the silicon atom of which at least one hydroxyl group or hydrolyzable group is bonded and which is cross linkable through formation of a siloxane bond (hereinafter referred to as "silicon-containing reactive group").

2. Description of the Related Art

The oxyalkylene base polymer having at least one silicon-containing reactive group (hereinafter referred to as "oxyalkylene base polymer (B)" or "polymer (B)") is known from U.S. Pat. Nos. 3,971,751, 3,979,384 and 4,323,488, Japanese Patent Publication Nos. 36319/1970, 12154/1971 and 32673/1974 and Japanese Patent Kokai Publication Nos. 156599/1975, 73561/1976, 6096/1979, 82123/1980, 123620/1980, 125121/1980, 131022/1980, 135135/1980 and 137129/1980.

The oxyalkylene base polymer (B) can be cured even at room temperature to give a cured material with good tensile properties so that it can be used as a sealant. The oxyalkylene base polymer (B) has such advantage that various coatings can be formed on a surface of its cured material, although the polymer (B) has drawbacks such that some acrylic coatings have poor adhesive properties to the surface of the cured material of the polymer (B), or almost all alkyd resin coatings cannot be hardened or dried on the surface of the cured material of the polymer (B). In addition, the cured material of the polymer (B) has insufficient weather resistance.

Several measures to improve such drawbacks of the oxyalkylene base polymer (B) have been proposed.

For example, it is proposed to blend a (meth)acrylate base polymer having the silicon-containing reactive group in the oxyalkylene base polymer (B) (cf. U.S. Pat. No. 4,593,068 and Japanese Patent Kokai Publication Nos. 122541/1984 and 31556/1985). Although the blending of such (meth)acrylate base polymer improves the drawbacks such as insufficient weather resistivity of the cured material of the oxyalkylene base polymer (B) and difficult coating with the acrylic or alkid resin coating, it is difficult to prepare a transparent composition or a composition with good storage stability which is one of the practically important properties of the curable polymer composition.

Alternatively, it is proposed to modify the oxyalkylene base polymer (B) through polymerization of a (meth)acrylate monomer in the presence of the polymer (B) (cf. U.S. Pat. No. 4,687,818 and Japanese Patent Kokai Publication Nos. 78223/1984, 168014/ 1984, 228516/1985 and 22817/1985). Although this method can improve the storage stability of the curable polymer composition, producibility, particularly per unit volume of a polymerization reactor is decreased since the once produced polymer (B) is recharged in the reactor and then the (meth)acrylate monomer is polymerized. Further, when polymers having a different composition of the oxyalkylene base polymer and the (meth)acrylate monomer are to be produced, the (meth)acrylate monomer should be polymerized in the presence of the oxyalkylene base polymer (B) in different batches. Therefore, the overall procedures are very troublesome.

Accordingly, it has been desired to provide a curable polymer composition having a suitable composition by simple blending.

SUMMARY OF THE INVENTION

One object of the present invention is to provide a curable polymer composition comprising the oxyalkylene base polymer (B), which composition provides a cured material having better weather resistance and a surface on which the acrylic coating can be more effectively coated or the alkyd resin can be more readily cured than the conventional curable composition comprising the polymer (B).

Another object of the present invention is to provide a curable polymer composition comprising the oxyalkylene base polymer (B), which composition can be prepared by blending of components and has improved transparency and storage stability.

These and other objects of the present invention can be accomplished by a curable polymer composition which comprises:

(A) a copolymer comprising a backbone which comprises (1) repeating units derived from at least one monomer selected from the group consisting of alkyl acrylates having 1 to 8 carbon atoms in the alkyl group and alkyl methacrylates having 1 to 8 carbon atoms in the alkyl group and (2) repeating units derived from at least one monomer selected from the group consisting of alkyl acrylates having at least 10 carbon atoms in the alkyl group and alkyl methacrylate having at least 10 carbon atoms in the alkyl groups and (B) an oxyalkylene base polymer having at least one silicon-containing reactive group.

DETAILED DESCRIPTION OF THE INVENTION

The repeating unit derived from the alkyl (meth)acrylate having 1 to 8 carbon atoms in the alkyl group which constitutes the backbone of the copolymer (A) may be represented by the formula:

wherein $R^1$ is an alkyl group having 1 to 8 carbon atoms and $R^2$ is a hydrogen atom or a methyl group. The repeating unit derived from the alkyl (meth)acrylate having at least 10 carbon atoms in the alkyl group which constitutes the backbone of the copolymer (A) may be represented by the formula:

wherein $R^2$ is the same as defined above and $R^3$ is an alkyl group having at least 10 carbon atoms.

$R^1$ in the formula (I) preferably has 1 to 4 carbon atoms. Preferred examples of $R^1$ are methyl, ethyl, propyl, n-butyl, tert.-butyl and 2-ethylhexyl. The alkyl groups $R^1$ in the repeating units (I) may be one kind of the alkyl group or two or more different kinds of the alkyl groups.

$R^3$ in the formula (II) preferably has 10 to 30 carbon atoms, more preferably 10 to 20 carbon atoms. Preferred examples of $R^3$ are lauryl, tridecyl, cetyl, stearyl, alkyl having 22 carbon atoms and behenyl. As in the case of $R^1$, the alkyl groups $R^3$ in the formula (II) may be one kind of the alkyl group or two or more different kinds of the alkyl groups, for example, a combination of the $C_{12}$ alkyl groups and the $C_{13}$ alkyl groups.

The backbone of the copolymer (A) comprises the repeating units (I) and (II). In the present invention, the backbone of the copolymer (A) contains at least 50 % by weight, preferably at least 70 % by weight of the repeating units (I) and (II) based on the whole weight of the copolymer (A). When the content of the repeating units (I) and (II) is less than 50 % by weight, compatibility of the copolymer (A) with the polymer (B) tends to decrease.

The weight ratio of the repeating units (I) to the repeating units (II) is preferably from 95:5 to 40:60, more preferably from 90:10 to 60:40. When this weight ratio is less than the above lower limit or higher than the above upper limit, the compatibility of the copolymer (A) with the polymer (B) tends to decrease.

The copolymer (A) may comprise repeating units derived from at least one of monomers which are copolymerizable with the repeating units (I) and (II). Specific examples of such copolymerizable monomer are monomers having a COOH group (e.g. acrylic acid, methacrylic acid, etc.), monomers having an amide group (e.g. acrylamide, methacrylamide, N-methylolacrylamide, N-methylolmethacrylamide, etc.), monomers having an epoxy group (e.g. glycidyl acrylate, glycidyl methacrylate, etc.), monomers having an amino group (e.g. diethylaminoethyl acrylate, diethylaminoethyl methacrylate, aminoethyl vinyl ether, etc.), acrylonitrile, iminol methacrylate, styrene, alpha-methylstyrene, alkyl vinyl ethers, vinyl chloride, vinyl acetate, vinyl propionate, ethylene and the like.

The copolymer (A) has a number average molecular weight of 500 to 100,000, preferably 500 to 10,000 in view of easy handling.

The copolymer (A) can be prepared by vinyl polymerization, for example, vinyl polymerization through a radical reaction to polymerize the monomers which give the repeating units (I) and (II) and optionally the copolymerizable monomer. The polymerization can be carried out by any of conventional modes such as solution polymerization and bulk polymerization. The polymerization reaction can be effected at a temperature of 50 to 150° C in the presence of a radical polymerization initiator and optionally in the presence of a chain transfer agent and/or a solvent.

Specific examples of the radical polymerization initiator are azobisisobutyronitrile, benzoylperoxide, etc. Specific examples of the chain transfer agent are n-dodecylmercaptan, tert.-dodecylmercaptan, etc. Examples of the solvent are non-reactive ones such as ethers, hydrocarbons, acetates, etc.

The backbone of the oxyalkylene base polymer (B) essentially consists of repeating units of the formula:

$$-R^4-O-$$ 

wherein $R^4$ is a divalent organic group. Preferably, the most of the $R^4$ groups in the backbone are hydrocarbon groups having 3 or 4 carbon atoms. Specific examples of $R^4$ are —CH(CH$_3$)CH$_2$—, —CH(C$_2$H$_5$)CH$_2$—, —C(CH$_3$)$_2$CH$_2$—, —CH$_2$CH$_2$CH$_2$CH$_2$— and the like. Among them, —CH(CH$_3$)CH$_2$— is preferable. The backbone of the oxyalkylene base polymer (B) may consist of a single kind of the repeating unit or two or more kinds of the repeating units.

The silicon-containing reactive group contained in the oxyalkylene base polymer (B) is the well known group and can be cross linked even at room temperature.

A typical example of such group may be represented by the formula:

wherein X is a hydroxyl group or a hydrolyzable group provided that when two or more X groups are present, they may be the same or different, $R^5$ is a monovalent hydrocarbon group having 1 to 20 carbon atoms or a triorganosiloxy group of the formula:

$$R'_3Si-O-$$ 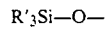

in which R' is a monovalent hydrocarbon group having 1 to 20 carbon atoms provided that three R' groups may be the same or different and that when two or more $R^5$ groups are present, they may be the same or different, "a" is 0, 1, 2 or 3, "b" is 0, 1 or 2 provided that the sum of "a" and "b" is at least 1, preferably from 1 to 4, and "m" is 0 or an integer of 1 to 18 provided that when "m" is not less than 2, the bracketed groups may be the same or different.

Among the silicon-containing reactive group, a group of the formula:

wherein X and $R^5$ are the same as defined above and "c" is 1, 2 or 3 is preferable.

The oxyalkylene base polymer (B) has at least one silicon-containing reactive group, preferably at least 1.1 silicon-containing reactive group, particularly 1.5 to 5 silicon-containing reactive group in a molecule on the average. Preferably, the silicon-containing reactive group is present at the molecular end of the oxyalkylene base polymer (B).

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group having 1 to 8 carbon atoms such as methoxy or ethoxy is preferable since it is mildly hydrolyzed and easily handled.

Specific examples of the group $R^5$ are alkyl groups (e.g. methyl, ethyl, etc.), cycloalkyl groups (e.g. cyclohexyl, etc.), aryl groups (e.g. phenyl, etc.), aralkyl groups (e.g. benzyl, etc.), alkenyl groups (e.g. vinyl) and the like.

The oxyalkylene base polymer (B) has a number average molecular weight of 500 to 30,000, preferably 3000 to 15,000. The oxyalkylene base polymer (B) may be used independently or as a mixture of two or more oxyalkylene base polymers B.

The oxyalkylene base polymer (B) may be prepared by addition reaction of a hydrogenated silicon-containing compound of the formula:

wherein $R^5$, X, a, b and m are the same as defined above with a polyether having an ethylenically unsaturated group of the formula:

wherein $R^6$ is a hydrogen atom or a monovalent organic group having 1 to 20 carbon atoms, $R^7$ is a monovalent organic group having 1 to 20 carbon atoms and c is 0 or 1 in the presence of a catalyst comprising a transistion metal in the VIII group of the Periodic Table.

Other processes for preparing the oxyalkylene base polymer (B) are as follows:

(1) An oxyalkylene base polymer having a terminal hydroxyl group is reacted with a polyisocyanate compound such as toluenediscoyanate to produce an oxyalkylene base polymer having a terminal isocyanate group, which is then reacted with a silicon-containing compound of the formula:

wherein W is an active hydrogen-containing group selected from the group consisting of a hydroxyl group, a carboxyl group, a mercapto group and a primary or secondary amino group, and n, $R^5$, $R^7$, X and n are the same as defined above.

(2) An oxyalkylene base polymer having the ethylenically unsaturated group (VI) is reacted with the silicon-containing compound (VII) in which W is a mercapto group.

(3) An oxyalkylene base polymer having a terminal hydroxyl group is reacted with a compound of the formula:

wherein $R^5$, $R^7$, X and n are the same as defined above.

These reactions do not limit the present invention.

In the preparation of the oxyalkylene base polymer (B), all or a part of the X groups may be converted to other hydrolyzable groups or hydroxyl group. For example, when the X group is the halogen or hydrogen atom, it can be preferably converted to an alkoxy group, an acyloxy group, an aminoxy group, an alkenyloxy group or a hydroxy group.

Specific examples of the hydrogenated silicon-containing compound (V) are halogenated silanes (e.g. trichlorosilane, methyldichlorosilane, dimethylchlorosilane, trimethylsiloxydichlorosilane, etc.), alkoxysilanes (e.g. trimethoxysilane, triethoxysilane methyldimethoxysilane phenyldimethoxysilane, 1,3,3,5,5,7,7,-heptamethyl-1,1-dimethoxytetrasiloxane, etc.), acyloxysilanes (e.g. methyldiacetoxysilane, trimethylsiloxymethylacetoxysilane, etc.), ketoximatesilanes (e.g.bis(dimethylketoximate)methylsilane, bis(cyclohexylketoximate)methylsilane, bis(diethylketoximate)trimethylsiloxysilane, etc.), hydrosilanes (e.g. dimethylsilane, trimethylsiloxymethylsilane, 1,1-dimethyl-2,2-dimethyldisiloxane, etc.) and alkenyloxysilanes (e.g. methyltri(isopropenyloxy)silane, etc.).

In the formula (VI), $R^6$ is a hydrogen atom or a substituted or unsubstituted $C_1$-$C_{20}$ monovalent organic group. Amount them, the hydrogen atom and a hydrocarbon group are preferable. Particularly preferable is the hydrogen atom. $R^7$ is a $C_1$-$C_{20}$ divalent organic group and preferable $—R^8—$, $—R^8OR^8—$, $—R^8—OCO—$, $—R^8NHCO—$ or $—R^8—CO—$ wherein $R^8$ is a $C_1$-$C_{10}$ divalent hydrocarbon group. Among them a methylene group is more preferable.

As described in Japanese Patent Kokai Publication No. 6097/1979, the oxyalkylene base polymer having the ethylenically unsaturated group (VI) may be prepared by reacting the terminal hydroxyl group in the oxyalkylene base polymer (A) with a compound having said unsaturated group to introduce the unsaturated group at the molecular end through an ether, ester, urethane or carbonate bond. Alternatively, during polymerization, an epoxy compound such as ethylene oxide or propylene oxide is copolymerized with an epoxy compound having the ethylenically unsaturated group such as allyl glycidyl ether to introduce the ethylenically unsaturated group in side chains.

As the catalyst comprising the transition metal in the VIII group of the Periodic Table, effectively used is a complex compound comprising the transition metal in the VIII group selected from the group consisting of platinum, rhodium, cobalt, palladium and nickel. Particularly useful are platinum base compounds such as platinum black, chloroplatinic acid, platinum-alcohol compounds, platinum olefin complexes, platinum aldehyde complexes, platinum ketone complexes and the like.

An amount of the oxyalkylene base polymer (B) is from 5 to 5,000 parts by weight per 100 parts by weight of the copolymer (A) in view of significant improvement of the properties of the composition. Preferably, the oxyalkylene base polymer (B) is used in an amount of 5 to 2,000 parts by weight per 100 parts by weight of the copolymer (A).

To accelerate the curing of the composition of the present invention, a curing accelerator can be added to the composition. As the curing accelerator, silanol condensation catalysts may be used. Preferred examples of the silanol condensation catalysts are organic tin compounds, organic titanium compounds, organic aluminum compounds, organic zirconium compounds, amines or their derivatives, acid phosphates, reaction products of the acid phosphates with amines, saturated or unsaturated polybasic carboxylic acids or their anhydrides, salts of the carboxylic acids with the amines, lead octylate, etc.

Specific examples of the organic tin compounds are tin carboxylates (e.g. dibutyltin acetate, dibutyltin dilaurate, dibutyltin maleate, dioctyltin dimanleate, dibutyltin phthalate, tin octylate, tin naphthenate, etc.), chelates (e.g. diacetylacetonatodibutyltin, etc.) and reaction products of dibutyltin methoxide or dibutyltin oxide with phthalates.

Specific examples of the organic titanium compounds include titanates (e.g. tetrabutyl titanate, tetraisopropyl titanate, tetrapropyl titanate, triethanolamine titanate, etc.) and chelates (e.g. tetraacetylacetonatotitanium, etc.).

Specific examples of the organic aluminum compound are trisacetylacetonatoaluminum, aluminum trisethylacetoacetate, diisopropoxyaluminum ethylacetoacetate and the like.

Specific examples of the organic zirconium compound are organic compounds (e.g. zirconium tetraisopropoxide, zirconium tetrabutoxide, etc.) and chelates (e.g. tetraacetylacetonatozirconium, etc.).

Specific examples of the amines or their derivatives are butylamine, octylamine, dibutylamine, monopethanolamine, diethanolamine, triethanolamine, diethylenetriamine, triethylenetriamine, oleylamine, cyclohexylamine, benzylamine, diethylaminopropylamine, xylylenediamine, triethylenediamine, guanidine, diphenylguanidine, 2,4,6-tris-(dimethylaminomethyl)phenol, morpholine, 2-ethyl-4-methylimidazole, N-methylmorpholine, 1,8-diazabicyclo[5.4.0]-undecene-7 (DBU) and their salts with the carboxylic acids, low molecular weight polyamide resins prepared from excess polyamine and polybasic acids, reaction products of excess polyamine and epoxy compounds, etc.

The acid phosphates are phosphates having a residue of the formula:

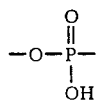

and include an organic acid phosphate of the formula:

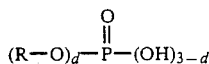

wherein R is an organic group and d is 1 or 2. Specific examples of the organic acid phosphate are $(CH_3O)_2POOH$, $CH_3OPO(OH)_2$, $(C_2H_5O)_2POOH$, $C_2H_5OPO(OH)_2$, $[(CH_3)_2CHO]_2POOH$, $(CH_3)_2CHOPO(OH)_2$, $(C_4H_9O)_2POOH$, $C_4H_9OPO(OH)_2$, $(C_8H_{17}O)_2POOH$, $C_8H_{17}OPO(OH)_2$, $(C_{10}H_{21}O)_2POOH$, $C_{10}H_{21}OPO(OH)_2$, $(C_{13}H_{27}O))_2$—POOH, $C_{13}H_{27}OPO(OH)_2$, $(HO-C_8H_{16}O))_2POOH$, $HO-C_8H_{16}OPO(OH)_2$, $(HO-C_6H_{12}O)_2POOH$, $HO-C_6H_{12}OPO(OH)_2$, $[CH_2(OH)CH(OH)O]_2POOH$, $CH_2(OH)CH(OH)OPO(OH)_2$, $[CH_2(OH)CH(OH)C_2H_4O]_2POOH$, $CH_2(OH)-CH(OH)C_2H_4OPO(OH)_2$, etc.

Among the above curing accelerators, preferable are the organic tin(II) compounds such as tin octylate, the organic titanium compounds such as tetrabutyl titanate, tetrapropyl titanate, tetraacetylacetonatotitanium, the organic aluminum compounds such as trisacetylacetonatoaluminum, aluminum trisethylacetoacetate and diisopropoxyaluminum ethylacetoacetate, and the organic zirconium compounds such as tetracetylacetonatozirconium, zirconium tetraisopropoxide and zirconium tetrabutoxide.

When the curing accelerator is used, it is used in an amount of 0.1 to 20 parts by weight, preferably 0.5 to 10 parts by weight per 100 parts weight of the oxyalkylene base polymer (B).

The curable polymer composition of the present invention may further contain a filler, a plasticizer, a solvent, a silicon-containing compound and other additives.

The filler may be any of the conventionally used ones, and includes silica such as silica fine powder, calcium carbonate (e.g. heavy or light calcium carbonate, glue type calcium carbonate, etc.), clay, talc, titanium oxide, zinc white, diatomaceous earth, barium sulfate, kaolin, aluminum silicate, magnesium oxide, carbon black and the like.

Specific examples of the plasticizer are dioctyl phthalate (DOP), butylbenzyl phthalate, chlorinated paraffin, epoxidized soybean oil, polyoxypropylene glycol, liquid polybutadiene, liquid polybutene and the like.

Specific examples of the solvent are ethers, hydrocarbons and the like.

Specific examples of the silicon-containing compound are silane coupling agents such as alkylalkoxysilanes (e.g. methyltrimethoxysilane, dimethyldimethoxysilane, trimethylmethoxysilane, n-propyltrimethoxysilane, etc.), alkylisopropenoxysilanes (e.g. dimethyldiisopropenoxysilane, methyltriisopropenoxysilane, γ-glycidoxypropylmethyldiisopropenoxysilane, etc.), alkoxysilanes with a functional group (e.g. γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γmercaptopropylmethyldimethoxysilane, etc.), silicone varnishes, polysiloxanes, silanol compounds (e.g. trimethylsilanol, triethylsilanol, triphenylsilanol, diphenylmethylsilanol, phenyldimethylsilanol, diphenylsilanediol, etc.), hexamethylsilazane, ethyl silicate, and the like.

Specific examples of the other additives are antisagging agents (e.g. hydrogenated castor oil, organic bentonite, etc.), colorants, stabilizers (e.g. anti-oxidant, UV light absorber, etc.) and the like.

Since the copolymer (A) is a (meth)acrylate polymer, the curable polymer composition of the present invention has good properties such that it provides the cured material on the surface of which the arcylic coating adheres with improved adhesivity, and the alkid coating is dried well. The cured material of the composition of the present invention has good adhesivity to various substrates and weather resistance. In addition, since the copolymer (A) has a long chain alkyl group, it has good compatibility with the oxyalkylene base polymer (B) so that the curable composition of the present invention has good transparency and storage stability, namely the composition does not suffer from clouding or phase separation during storage, and that the blending ratio of the copolymer (A) and the polymer (B) can be freely selected so as to adjust hardness of the cured material. The curable polymer composition of the present invention has good compatibility with other polymers with which the oxyalkylene base polymer alone has little compatibility.

The curable polymer composition of the present invention can be used as an adhesive, a coating, a waterproofing material, a sealing agent, a templating material, a castable rubber material or a foaming material.

For example, when the curable polymer composition of the present invention is used as the sealing agent, it is mixed and kneaded with the curing accelerator and other components and stored in the sealed condition in the absence of moisture to give a one-pack type elastomeric sealing material which can be stored stably for a long time, and be cured quickly when exposed to moisture to give a rubbery cured material having good weather resistance, transparency and tensile elongation.

When the curable composition of the present invention is used as the coating, it has far larger tensile elongation and better weather resistance than the conventional ones so that it has good performances as a high-modulus coating for buildings, a primer for concrete constructions or a waterproof material.

When the curable composition of the present invention is used as the waterproof coating, it gives the waterproof coating with good balance between strength at break and elongation. In addition, since it has good durability and water resistance, it suffers less blisters or peeling off.

When the curable composition of the present invention is used as the adhesive, it has excellent bond strength, particularly good balance between the peel strength and adhesive strength under shear so that it may be useful as a structural adhesive.

PREFERRED EMBODIMENTS OF THE INVENTION

The present invention will be explained further in detail by following Examples, wherein "parts" are by weight unless otherwise indicated. Preparation Examples 1-6

To xylene kept at 110° C. an amount of which is specified in Table 1, a monomer mixture shown in Table 1 in which azobisisobutyronitrile as the polymerization initiator was dissolved was dropwise added over 6 hours followed by post-polymerization for 2 hours to obtain the copolymer (A).

PREPARATION EXAMPLE 7

In an autoclave equipped with a stirrer, polyoxypropylene base polymer 97% of the molecular ends of which had allyl ether groups (average molecular weight, 8,000) 800 g) was charged and then methyldimethoxysilane (19 g) was added. To this mixture, 0.34 ml of a solution of chloroplatinic acid ($H_2PtCl_6 \cdot 6H_2O$) (8.9 g) in a mixture of isopropanol (18 ml) and tetrahydrofuran (160 ml) was added, and the reaction was effected at 80° C. for 6 hours to obtain polyoxypropylene base polymer having 1.7 groups of the formula:

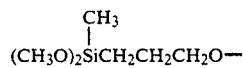

per molecule on the average according to the quantitative analysis of the silicon-containing groups by the NMR analysis. The reaction mixture contained little silicon hydride groups according to the analysis of the amount of residual silicon hydride residues therein by IR spectroscopy.

EXAMPLES 1-6 AND COMPARATIVE EXAMPLES 1-2

The copolymer (A) prepared in Preparation Examples 1-6 and the oxyalkylene base polymer (B) prepared in Preparation Example 7 were mixed in the same solid amounts, and the solvent was evaporated off with a rotary evaporator at 80° C. under reduced pressure. Then, transparence of the composition was observed.

In Example 6 and Comparative Example 2, polybutene (Polybutene OR manufactured by Idemitsu Petrochemical) was added in an amount of 50 parts per 100 parts of the oxyalkylene base polymer (B).

The transparency and compatibility of the composition were visually observed, and alternatively optically observed and expressed in terms of haze rates. The results are shown in Table 2.

TABLE 1

| Preparation Example No. | 1 | 2 | 3 | 4 | 5 | 6 |
|---|---|---|---|---|---|---|
| Monomer mixture (parts) | | | | | | |
| Monomer (I) | | | | | | |
| Butyl acrylate | 53.0 | 32.3 | 54.6 | 59.6 | 53.0 | 66.6 |
| Methyl methacrylate | — | 20.3 | — | — | — | — |
| Monomer (II) | | | | | | |
| Stearyl methcarylate*1 | 13.6 | 14.6 | 14.0 | 7.0 | — | — |
| Acryester SL*2 | — | — | — | — | 13.6 | — |
| AIBN*3 | 3.4 | 3.4 | 1.4 | 3.4 | 3.4 | 3.4 |
| Xylene | 30.0 | 30.0 | 30.0 | 30.0 | 30.0 | 30.0 |
| Copolymer (A) | | | | | | |
| Mn*4 | 4200 | 4500 | 9200 | 4900 | 4200 | 4700 |
| Mw/Mn*4 | 2.5 | 2.5 | 2.1 | 2.1 | 2.5 | 2.3 |

Note:
*1 Acryester S manufactured by Mitsubishi Rayon.
*2 $C_{12}/C_{13}$ Mixed alkyl methacrylate manufactured by Mitsubishi Rayon.
*3 Azobisisobutyronitrile.
*4 Mn: Number averaged molecular weight. Mw/Mn: Molecular weight distribution. Both measured by GPC.

TABLE 2

| | Curable Composition | | | Condition after kept overnight | | Condition after kept at 50° C. for 14 days | | |
|---|---|---|---|---|---|---|---|---|
| Example No. | Copolymer A (Prep Ex. No.) | Polymer B (Prep. Ex. No.) | Additive | Transparency | Haze rate (%) | Transparency | Haze rate (%) | Compatibility |
| 1 | 1 | 7 | — | Homo- | <10 | Homo- | <10 | Good |
| 2 | 2 | 7 | — | gene- | <10 | gene- | <10 | Good |
| 3 | 3 | 7 | — | ous/ | 30 | ous/ | 35 | Good |
| 4 | 4 | 7 | — | Trans- | <10 | Trans- | <10 | Good |
| 5 | 5 | 7 | — | parent | <10 | parent | <10 | Good |
| 6 | 1 | 7 | *1 | | <10 | | <10 | Good |
| Comp. 1 | 6 | 7 | — | *2 | *3 | *3 | *3 | No |
| Comp. 2 | 6 | 7 | *1 | *3 | *3 | *3 | *3 | No |

Note:
*1 Polybutene OR.
*2 Homogeneous/opaque.
*3 Phase separation.

From the results of Table 2, it is seen that the mixture of the copolymer (A) prepared in each of Preparation Examples 1, 2, 4 and 5 and the oxyalkylene base polymer (B) prepared in Preparation Example 7 was a homogeneous and transparent mixture and maintained good conditions after storage at 50° C. for 14 days. Also the mixture of the copolymer (A) prepared in Preparation Example 3 and the oxyalkylene base polymer (B) prepared in Preparation Example 7 was visually transparent although its Haze rate was slightly high. In addition, the mixture of the copolymer (A) prepared in Preparation Example 1, the oxyalkylene base polymer (B) prepared in Preparation Example 7 and polybutene was a transparent mixture.

From the above, it is understood that since the copolymer (A) and the oxyalkylene base polymer (B) are compatible with each other, the curable polymer composition of the present invention has good transparency and suffers from no phase separation after standing for a long time. Further, the curable polymer composition of the present invention can be compatible with the polymer which is not compatible with the oxyalkylene base polymer (B).

EXAMPLE 7 AND COMPARATIVE EXAMPLE 3

In the same manner as in Examples 1-6, the copolymer (A) prepared in Preparation Example 1 and the oxyalkylene base polymer (B) prepared in Preparation Example 7 were blended in a ratio of 50/100 (solid) to obtain a pale yellow transparent viscous resin composition without solvent.

For comparison (Comparative Example 3), the oxyalkylene base polymer (B) prepared in Preparation Example 7 and DOP which is well known as a plasticizer were blended in a ratio of 50/100.

To each composition, calcium carbonate (CCR manufactured by Shiraishi Industries) (120 g), titanium oxide (R820 manufactured by Iashihara Industries) (20 g) and styrenated phenol (0.5 g), diacetonatodibutyltin (2 g) were added per 100 g of the oxyalkylene base polymer (B) and kneaded with rolls three times. Then, a polymer composition was formed in a sheet having a thickness of 3 mm and aged at 23° C., 65 %RH for one day.

On the surface of the aged sheet, five kinds of commercially available acrylic coatings were brush coated and kept standing at 23° C., 65 %RH for one day.

The commercially available acrylic coatings used were as follows:

Aqueous acrylic coating A
  Camel Prostalloy FB-001 manufactured by Fujikura Chemical
Aqueous acrylic coating B
  AFD Acryt 6000 manufactured by Suzuka Paint
Aqueous acrylic coating C
  Tsuyaari Suisei 21 manufactured by Kansai Paint
Aqueous acrylic coating D
  Kanpemastic manufactured by Kansai Paint Solvent type acrylic coating
  Lafton Acryenamel manufactured by Suzuka Paint Then, the bonding property of the coating was examined through a spatula test (with visual evaluation) and adhesive tape peeling test.

In the spatula test, the coated film was peeled off at the interface between the polymer sheet and the coating and the bond strength was evaluated according to the following criteria:
  A: The sheet suffered cohesive failure.
  B: A part of the coating was peeled off at the interface.
  C: Most of the coating was peeled off at the interface.

The adhesive tape test was carried out according to JIS K 5400 as follows:

The coating was cut along six vertical lines and along six horizontal lines with a knife to form 25 square areas each of 2 mm×2 mm like a chess board. Then, an adhesive tape was adhered on the cut areas and peeled off quickly, and the number of the square areas peeled off was counted.

The results are shown in Table 3.

TABLE 3

| Example No. | Composition (parts) | | | Aqueous acrylic coating A | | Aqueous acrylic coating B | | Aqueous acrylic coating C | | Aqueous acrylic coating D | | Solvent type acrylic coating E | |
|---|---|---|---|---|---|---|---|---|---|---|---|---|---|
| | Copolymer A | Polymer B | Plasticizer (DOP) | Spatula | Tape | Spatula | Tape | Spatula | Tape | Spatula | Tape | Spatula | Tape |
| 7 | 50[1] | 100 | — | A | 0 | A | 3 | A | 0 | A | — | A | 0 |
| Comp. 3 | — | 100 | 50 | A | 0 | C | 22 | B | 4 | A | — | C | 8 |

Note:
[1] As the solid content.

examples 8-9 AND COMPARATIVE EXAMPLES 4-5

The copolymer (A) prepared in Preparation Example 1, the oxyalkylene base polymer (B) prepared in Preparation Example 7 and the plasticizer were mixed in amounts shown in Table 4. After adding the same additives as used in Example 7, the composition was formed in a sheet in the same manner as in Example 7. After aging the sheet at 23° C., 65 %RH for one day, on the sheet surface, a commercially available alkid coating (Rubbol AZ manufactured by Sikkens, Netherlands) was brush coated and kept standing at 23° C., 65 %RH for a period specified in Table 4 to examine the drying characteristics.

In Table 4, "liquid polybutadiene-1,2" is Nisso Polybutadiene B-1000 manufactured by Nippon Soda.

The drying characteristics is evaluated according to the following criteria:
  AA: The coating was completely hardened without tackiness.
  A: The coating was hardened but the surface was slightly tacky.
  B: The coating was not completely hardened and was transferred to the finger when touched.
  C: The coating was not hardened.

TABLE 4

| Example No. | Composition (parts) | | | | Drying characteristics | | |
|---|---|---|---|---|---|---|---|
| | Copolymer A | Polymer B | DOP | Liq. polybutadiene-1,2 | After 1 day | After 3 days | After a week |
| 8 | 50[1] | 100 | — | — | B | B | AA |
| 9 | 50[1] | 100 | — | 5 | B | A | AA |
| Comp. 4 | — | 100 | 50 | — | C | C | C |

TABLE 4-continued

| Example No. | Composition (parts) | | | | Drying characteristics | | |
|---|---|---|---|---|---|---|---|
| | Copolymer A | Polymer B | Plasticizer | | After 1 day | After 3 days | After a week |
| | | | DOP | Liq. polybutadiene-1,2 | | | |
| Comp. 5 | — | 100 | 50 | 5 | C | C | B |

Note:
*[1] As solid content.

What is claimed is:

1. A curable polymer composition which comprises:
   (A) a copolymer comprising a backbone which comprises (1) repeating units derived from at least one monomer selected from the group consisting of alkyl acrylates having 1 to 8 carbon atoms in the alkyl group and alkyl methacrylates having 1 to 8 carbon atoms in the alkyl group and (2) repeating units derived from at least one monomer selected from the group consisting of alkyl arcylates having at lest 10 carbon atoms in the alkyl group and alkyl methacrylate having at least 10 carbon atoms in the alkyl groups and
   (B) an oxyalkylene base polymer having at least one silicon-containing group wherein the silicon atom of the group has at least on hydroxyl group or hydrolyzable group bonded and which is cross linkable through formation of a siloxane bond.

2. The curable polymer composition according to claim 1, wherein the repeating unit derived from the alkyl (meth)acrylate having 1 to 8 carbon atoms in the alkyl group which constitutes the backbone of the copolymer (A) is represented by the formula:

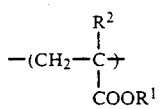

(I)

wherein $R^1$ is an alkyl group having 1 to 8 carbon atoms and $R^2$ is a hydrogen atom or a methyl group, and the repeating unit derived from the alkyl (meth)acrylate having at least 10 carbon atoms in the alkyl group which constitutes the backbone of the copolymer (A) is represented by the formula:

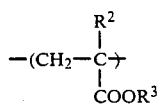

(II)

wherein $R^2$ is the same as defined above and $R^3$ is an alkyl group having at least 10 carbon atoms.

3. The curable polymer composition according to claim 1, wherein the copolymer (A) has a number average molecular weight of 500 to 100,000.

4. The curable polymer composition according to claim 1, wherein the oxyalkylene base polymer (B) has a backbone which essentially consists of repeating units of the formula:

$$-R^4-O-$$

wherein $R^4$ is an alkylene organic group.

5. The curable polymer composition according to claim 1, wherein the silicon-containing group to the silicon atom of which at least one hydroxyl group or hydrolyzable group is bonded and which is cross linkable through formation of a siloxane bond is a group represented by the formula:

(III)

wherein X is a hydroxyl group or a hydrolyzable group provided that when two or more X groups are present, they may be the same or different, $R^5$ is a monovalent hydrocarbon group having 1 to 20 carbon atoms or a triorganosiloxy group of the formula:

$$R'_3Si-O-$$

in which R' is a monovalent hydrocarbon group having 1 to 20 carbon atoms provided that three R' groups may be the same or different and that when two or more $R^5$ groups are present, they may be the same or different, "a" is 0, 1, 2 or 3, "b" is 0, 1 or 2 provided that the sum of "a" and "b" is at least 1, and "m" is 0 or an integer of 1 to 18.

6. The curable polymer composition according to claim 1, wherein the oxyalkylene base polymer (B) has a number average molecular weight of 500 to 30,000.

7. The curable polymer composition according to claim 1, wherein the oxyalkylene base polymer (B) is contained in an amount of 5 to 5,000 parts by weight per 100 parts by weight of the copolymer (A).

8. The curable polymer composition of claim 5 wherein the sum of "a" and "b" is from 1 to 4.

* * * * *